United States Patent [19]

Schlegel et al.

[11] Patent Number: 4,575,063

[45] Date of Patent: Mar. 11, 1986

[54] VERTICALLY ADJUSTABLE DEVICE

[75] Inventors: Wolfgang Schlegel, Oehringen; Arthur Wilke, Bad Friedrichshall-Jagstfeld, both of Fed. Rep. of Germany

[73] Assignee: Schlegel GmbH, Oehringen, Fed. Rep. of Germany

[21] Appl. No.: 534,989

[22] Filed: Sep. 23, 1983

[30] Foreign Application Priority Data

Oct. 13, 1982 [DE] Fed. Rep. of Germany ....... 3238024

[51] Int. Cl.$^4$ .............................................. B25B 1/22
[52] U.S. Cl. ...................................... 269/78; 248/230
[58] Field of Search .................... 269/77, 78, 91, 153, 269/160, 243; 248/125, 295.1, 296, 230, 225.31

[56] References Cited

U.S. PATENT DOCUMENTS

| 559,951 | 5/1896 | Rhind et al. | 248/230 |
| 1,326,807 | 12/1919 | Townsend et al. | 269/91 X |
| 1,445,079 | 2/1923 | Hammond et al. | 269/78 X |
| 2,570,985 | 10/1951 | Riemenschneider et al. | 248/230 |
| 2,573,276 | 10/1951 | Roberts | 269/153 X |
| 4,387,886 | 6/1983 | Schlegel et al. | 269/78 X |

Primary Examiner—Frederick R. Schmidt
Assistant Examiner—Steven P. Schad
Attorney, Agent, or Firm—Daniel H. Kane, Jr.

[57] ABSTRACT

A vertically adjustable carrier for a vise or the like comprises a vertical support tube which is guided in a clamping device comprising two semicylindrical shells which can be clamped together. The shells are connected on one side by two support elements arranged vertically one below the other, and on the other side there is provided a clamping screw which is arranged between the horizontal planes through the support elements. By such arrangement a great resistance against unintended turning of the support tube even with a relatively slight tightening of the clamping screw is obtained.

12 Claims, 9 Drawing Figures

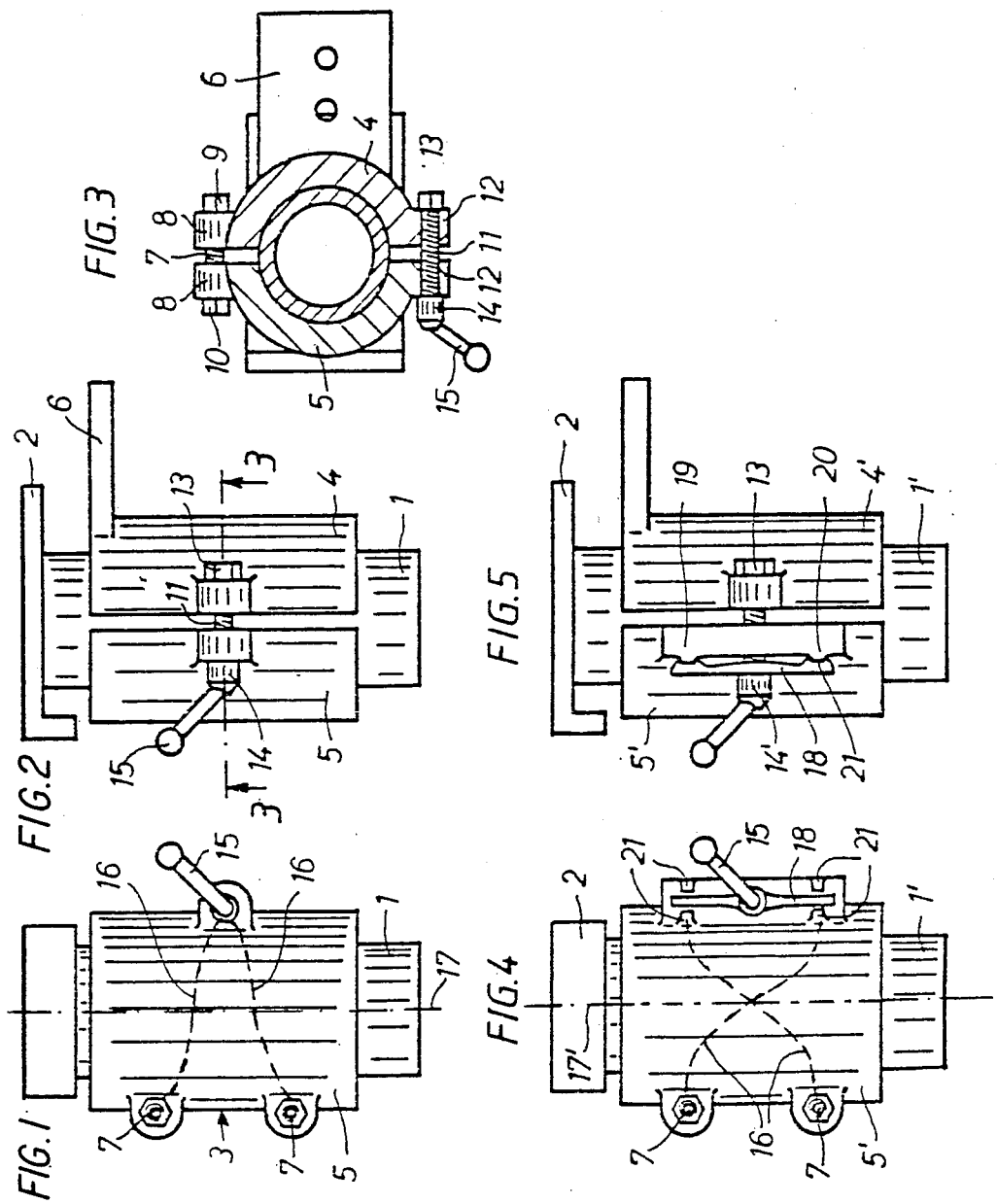

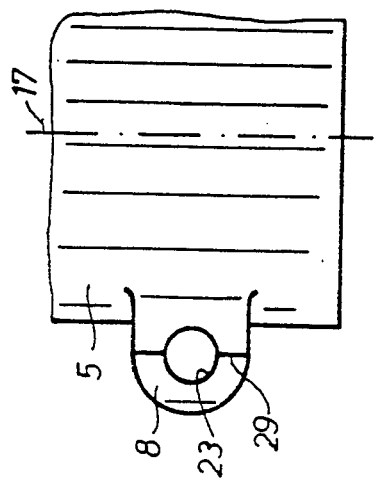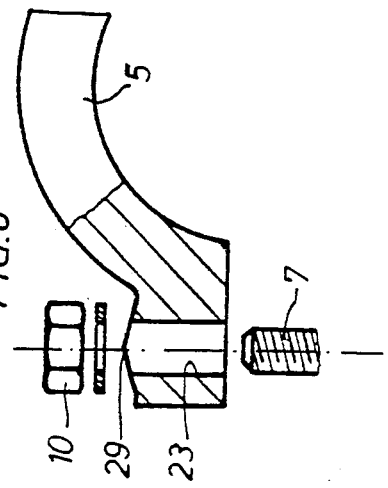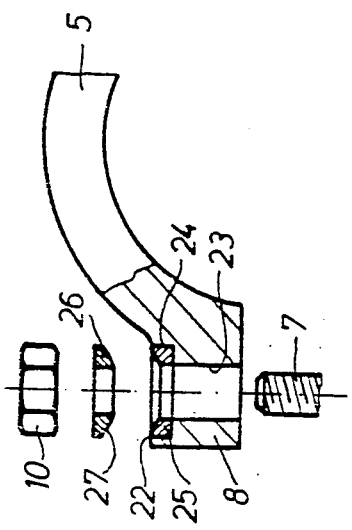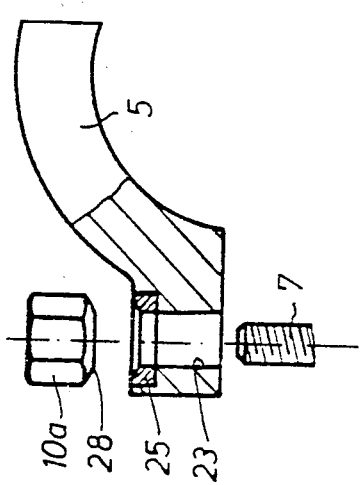

VERTICALLY ADJUSTABLE DEVICE

FIELD OF THE INVENTION

This invention relates to a novel, vertically adjustable device for vises, assembly platforms and the like. Such devices are useful for bringing the vise or the like into an optimum vertical position with respect to the worker in order to facilitate the working of a workpiece or the assembly of an apparatus.

BACKGROUND OF THE INVENTION

Such devices comprise a vertical cylindrical support tube supporting at its upper end the vise or the assembly platform and being guided for vertical movement directly or by means of a guide tube in a mounting by which the support tube can be attached to a work bench or the like. The mounting comprises two semicylindrical clamping shells which embrace the support tube and which can be clamped together to firmly hold the support tube in any desired vertical position. To this end the clamping shells are interconnected on one side i.e. along adjacent lateral edges by support means, and on the other side they can be clamped together by a clamping screw comprising a head which abuts against an outer surface of one shell and a nut with a handle abutting against an outer surface of the other shell. In order to facilitate the vertical adjustment of the support tube there is often provided a gas spring which exerts an upwardly directed force on the support tube. Such device is e.g. disclosed in Patent Application Ser. No. 436,282.

It is one of the main problems of such vertically adjustable devices to create without excessive force a sufficient clamping force to prevent an undesired rotation of the support tube and especially the vise supported thereon when a workpiece is worked e.g. filed. The present devices do not solve this problem

OBJECT OF THE INVENTION

Therefore it is an object of the invention to provide a vertically adjustable device of the kind set forth wherein an unintended turning of the support tube and the member carried by it is prevented, without excessive force being necessary to clamp the clamping shells together.

DISCLOSURE OF THE INVENTION

According to the invention this object is met by providing two support means in a vertical distance one below the other and arranging the clamping screw essentially in the middle between the two horizontal planes passing through the support means.

By the proposed arrangement of two support places on one side and a clamping place on the other side of the half shells approximately in the middle between the support places the effect is obtained that the line of action between the support places and the clamping place is not perpendicular to the longitudinal central axis of the support tube but inclined thereto along a helix or screw line. Thereby a considerably greater resistance against turning of the support tube is created compared to a clamping device which has one support place only in the same plane as the clamping point.

A yoke can be provided between the clamping screw and the outer surface of the respective shell, said yoke having two points of contact, one above and the other below said clamping screw, with said outer surface. Thereby two clamping places are provided which again are vertically offset with respect to the two support places so that the lines of action between the support places and the clamping places are inclined to the longitudinal axis of the support tube.

In order to prevent an unintended turning of the yoke when the clamping nut is tightened a locking means can be provided on the outer surface of the respective shell. Said locking means may comprise two pairs of projections on the outer surface of the shell, the projections of each pair being spaced sufficiently to accommodate the yoke between them. The support means are usually screws which extend through bores in both clamping shells, the heads of the screws and the nuts cooperating with the outer surface of the one and the other shell, respectively. In order to reduce the clamping force to zero after loosening the clamping screws it is preferred that the contact area between the nuts and the outer surface of the respective shell is in the form of a line. This line can be linear and parallel to the longitudinal central axis of the support tube. By this means a certain tiltability of the clamping shells relatively to each other after loosening of the clamping screw is obtained. Alternatively said contact area can be in the form of a circular line whereby one of the contacting surfaces of the nut and of the outer surface of the clamping shell is spherical and the other is conical.

BRIEF DESCRIPTION OF THE DRAWINGS

A preferred example embodiment of the invention and some modifications thereof are shown in the accompanying drawings.

FIG. 1 is a front elevation of a vertically adjustable device according to the invention.

FIG. 2 is a side elevation of the device of FIG. 1.

FIG. 3 is a sectional view taken along lines 3—3 in FIG. 2.

FIG. 4 is a front elevation of a modified device according to the invention.

FIG. 5 is a side elevation of the device shown in FIG. 4.

FIG. 6 is a partial view, partly in section, of a clamping shell and support means which allow for a tilting movement of the shells after loosening.

FIG. 7 is a view similar to FIG. 6 with slightly modified support means.

FIG. 8 is a view similar to FIG. 6 with a formation of the outer surface of the shell which allows for a tilting movement of the shells after loosening of the support screws.

FIG. 9 is a plan view of the shell shown in FIG. 8.

Referring to FIGS. 1 to 3, there is shown a vertically adjustable device which comprises a vertical support tube 1 carrying at its upper end a plate 2 on which a vise, an assembly platform or the like can be mounted. The support tube 1 extends through a clamping device 3 which comprises two clamping shells 4 and 5 of semicylindrical configuration. Clamping shell 4 is stationary and comprises a bracket 6 for connecting the clamping device 3 to a work bench or the like. The clamping shells 4 and 5 are interconnected on one side by means of two support means in form of screws 7 which extend through bores in lugs 8 formed on shells 4 and 5. The heads 9 of the screws 7 rest against the outer surface of the clamping shell 4 and their nuts 10 rest against the outer surface of clamping shell 5. On the other side of the clamping shells 4 and 5 there is provided a clamping screw 11 which extends through bores in lugs 12 arranged on the shells 4 and 5. The head 13 of screw 11 rests against the outer surface of shell 4 and its nut 14 rests against the outer surface of shell 5. The nut 14 is provided with a handle 15.

By the arrangement of two support means in form of the screws 7 in a vertical distance one below the other on one side of the shells 4 and 5 and a clamping means in form of the clamping screw 11 on the other side and between the horizontal planes through the screws 7 the clamping forces exerted by tightening of the clamping screw 11 act preferably along the lines of action 16 shown in dash lines. These lines of action are inclined to the longitudinal center axis 17 of the support tube 1 so that a greater resistance against turning of the support tube 1 is generated than with the arrangement of one support means only in the same plane with the clamping screw as usual. By the proposed arrangemant of two support means an unintended turning of the support tube 1 can be prevented already by application of relative little force for tightening the clamping screw nut 14.

In the embodiment of FIGS. 4 and 5 a yoke or bracket 18 is provided between the clamping nut 14' and the outer surface of clamping shell 5'. That yoke 18 abuts on the outer surface of shell 5' on two places 19 and 20 above and below, respectively, of the clamping screw 11'. By this arrangement the main lines of action 16' of the clamping forces extend again inclined to the longitudinal center axis 17' of the support tube 1' i.e. along a helix or screw line. By this arrangement an even greater resistance against turning of the support tube 1 than with the embodiment of FIGS. 1 to 3 is obtained with less force. In order to prevent a turning of the yoke 18 when tightening the clamping nut 14' the outer surface of clamping shell 5' is provided with projections 21. As shown two pairs of projections 21 are provided, the projections of each pair being spaced sufficiently to accommodate the yoke 18 between them.

Although basically also other support means e.g. hooks and eyes may be provided the use of screws 7 with heads 9 and nuts 10 is preferred. In order to facilitate a vertical adjustment and a turning of the support tube 1 and 1' respectively, after loosening of the clamping nut 14 and 14', resp., a certain tiltability between the clamping shells 4 and 5 or 4' and 5' resp., is advantageous. To this end the contact or contact interface between the nuts 10 and the outer surface of the clamping shell 5 can be in the form of a line. In the embodiment of FIG. 6 this contact or contact interface is in the form of a circular line. Thereby the outer surface 22 of clamping shell 5 is provided with a circular recess 24 surrounding the through bore 23 for accommodating the screw 7. An insert 25 having conical inner surface is inserted in recess 24. A washer 26 with a spherical lower surface 27 is arranged between the nut 10 and the insert 25. By cooperation of the spherical washer 26 with the conical inner surface of insert 25 the clamping shell 5 can be tilted with respect to the clamping shell 4 a small amount i.e. within the scope of the clearance between the screw 7 and the wall of bore 23 when the clamping nut 14 is loosened. By this tiltability the clamping is immediately removed.

The embodiment of FIG. 7 differs from the embodiment of FIG. 6. in that the washer 26 is omitted and in lieu thereof the nut 10a has a spherical lower surface 28 which cooperates with the conical inner surface of insert 25.

In the embodiment of FIGS. 8 and 9 the relative tiltability between the clamping shells 4 and 5 after loosening of the clamping screw or nut is obtained by providing a line contact along a straight line only between the nut 10 and the outer surface of shell 5. To this end a ridge is provided on the outer surface the crest 29 thereof extending parallel to the longitudinal center axis 17 of the support tube. This crest 29 forms the tilting axis about which the clamping shell 5 can be tilted with respect to the clamping shell 5 within the scope of the clearance between the screw 7 and the bore 23 when the clamping screw is loosened.

We claim:

1. A vertically adjustable device comprising a vertical support tube for carrying a vise, an assembly platform or the like, and a mounting for attachment of the support tube to a work bench or the like, said mounting comprising two semicylindrical clamping shells which surround the support tube and which are interconnected on one side by support means and can be clamped together on the other side by a clamping screw which comprises a head which abuts against an outer surface of one shell and a nut with handle which abuts against an outer surface of the other shell, the improvement that two support means are arranged in a vertical distance one below the other, that the clamping screw is arranged essentially in the middle between the horizontal planes through the two support means, wherein a yoke is provided between the clamping screw and the outer surface of the respective shell, said yoke having two points of contact, one above and one below said clamping screw, with said outer surface and further comprising locking means formed on the surface of the respective shell to engage the yoke and to prevent turning of said yoke.

2. A vertically adjustable device according to claim 1, wherein the distance between said two points of contact is different from the distance between the two support means.

3. A vertically adjustable device according to claim 1, wherein said locking means comprise two pairs of projections on the outer surface of the shell, the projections of each pair being spaced sufficiently to accommodate the points of contact of the yoke between them.

4. A vertically adjustable device according to claim 1, wherein said support means are screws extending through bores in both clamping shells, the screw heads abutting on the outer surface of one shell and the screw nuts abutting on the outer surface of the other shell, the contact interface between the nuts and the outer surface of the respective clamping shell being constructed and arranged along a line for limited tiltability between the clamping shells about said line of contact after loosening the clamping screw.

5. A vertically adjustable device according to claim 4, wherein the contact interface is linear and extends parallel to the longitudinal central axis of the support tube.

6. A vertically adjustable device according to claim 4, wherein said contact interface is in form of a circular line, one of the contacting surfaces of the nut and the outer surface of the clamping shell being spherical and the other being conical.

7. A vertically adjustable device according to claim 6, wherein said outer surface comprises recesses for accommodating conical inserts and the lower side of the nuts cooperating therewith being spherical to provide said circular line of contact.

8. A vertically adjustable device according to claim 6, wherein said outer surface comprises recesses for accommodating conical inserts, and wherein washers with spherical lower surface are provided between the nuts and the inserts to provide said circular line of contact.

9. A vertically adjustable device having a vertical support tube for carrying a vice, assembly platform, or similar object, and a mounting for mounting the support tube relative to a work bench or other support, said mounting comprising two semicylindrical clamping shells embracing said support tube, support means interconnecting the semicylindrical clamping shells on one side, and a clamping screw on the other side of the clamping shells from the support means said clamping screw comprising a head abutting against an outer surface of one shell and a nut with handle abutting against an outer surface of the other shell, the improvement comprising:

said support means interconnecting the clamping shells on one side comprising two interconnecting supports spaced apart a vertical distance one below the other, said clamping screw being constructed and arranged on the other side of the clamping shells intermediate the two interconnecting supports and between horizontal planes passing through said interconnecting supports;

yoke means interposed between the clamping screw and the outer surface of one of the clamping shells for actuating said clamping shells, said yoke constructed and arranged with two spaced apart points of contact for engaging the outer surface of the respective clamping shell, one point of contact above said clamping screw and the other point of contact below said clamping screw, said outer surface of the respective clamping shell being formed with irregular surface locking means for receiving said two points of contact of the yoke means to prevent turning of the yoke means when the clamping screw is tightened;

and wherein said two interconnecting supports on the one side of the semicylindrical clamping shells comprise screws and bores formed through the respective sides of the two semicylindrical clamping shells, said screws extending through said bores, said screws formed with screw heads abutting at the outer surface of one shell and screw nuts abutting at the outer surface of the other shell, said screw nuts and outer surface of the respective clamping shell being constructed and arranged so that the contact interface between the screw nuts and the outer surface of the respective clamping shell forms a line of contact for tiltability of the two semicylindrical clamping shells relative to each other about said line of contact upon loosening the clamping screw thereby facilitating release of the clamp for vertical adjustment and rotation of the support tube in the mounting.

10. The vertically adjustable device of claim 9 wherein the outer surface of the respective clamping shell is formed with an apex ridge and wherein the contact line is linear and extends parallel to the longitudinal central axis of the support tube along said apex ridge.

11. The vertically adjustable device of claim 9 wherein said contact line is in the form of a circular line and wherein one of the contacting surfaces of the screw nut and the outer surface of the respective clamping shell is spherical and the other conical.

12. The vertically adjustable device of claim 11 wherein the outer surface of the respective clamping shell comprises recesses for receiving and accommodating conical face inserts and wherein the engaging side of the screw nuts is formed with a spherical surface thereby resulting in said circular line of contact between the conical face inserts and spherical engaging surface of the screw nuts.

* * * * *